United States Patent
Redko et al.

(10) Patent No.: US 12,303,876 B2
(45) Date of Patent: May 20, 2025

(54) METHODS FOR CELLULOSE HYDROLYSIS USING SULFONATED POLYAROMATIC CATALYSTS

(71) Applicant: BOARD OF TRUSTEES OF MICHIGAN STATE UNIVERSITY, East Lansing, MI (US)

(72) Inventors: Mikhail Redko, Ann Arbor, MI (US); James E. Jackson, Haslett, MI (US); Christopher M. Saffron, Okemos, MI (US); Kyle Matthew Kilponen, Novi, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 1031 days.

(21) Appl. No.: 17/296,591

(22) PCT Filed: Nov. 26, 2019

(86) PCT No.: PCT/US2019/063138
§ 371 (c)(1),
(2) Date: May 25, 2021

(87) PCT Pub. No.: WO2020/112701
PCT Pub. Date: Jun. 4, 2020

(65) Prior Publication Data
US 2022/0001367 A1    Jan. 6, 2022

Related U.S. Application Data

(60) Provisional application No. 62/771,352, filed on Nov. 26, 2018.

(51) Int. Cl.
*B01J 31/02*      (2006.01)
*C08B 1/00*      (2006.01)

(52) U.S. Cl.
CPC ............. *B01J 31/0225* (2013.01); *C08B 1/00* (2013.01)

(58) Field of Classification Search
CPC ........ B01J 31/0225; C08B 1/00; Y02E 50/30; C13K 1/02

(Continued)

(56) References Cited

U.S. PATENT DOCUMENTS 2,141,383 A    12/1938   Fink et al.
5,868,851 A   *   2/1999   Lightner ................. C13K 1/04
                                                   127/55

(Continued)

FOREIGN PATENT DOCUMENTS

WO    WO-2010/015404 A1    2/2010
WO    WO-2010/069583 A1    6/2010

OTHER PUBLICATIONS

Suganuma et al., Synthesis and acid catalysis of cellulose-derived carbon-based solid acid, 2010, Solid State Sciences, 12, 1029-1034 (Year: 2010).*

(Continued)

*Primary Examiner* — Colin W. Slifka
*Assistant Examiner* — Ritu S Shirali
(74) *Attorney, Agent, or Firm* — MARSHALL, GERSTEIN & BORUN LLP (57) ABSTRACT

A method for hydrolyzing cellulosic material includes combining the cellulosic material with a sulfonated polyaromatic catalyst in water to at least partially hydrolyze the cellulosic material and to form a monosaccharide hydrolysis product, thereby forming a reaction mixture including (i) an aqueous phase with the monosaccharide hydrolysis product in solution therein, and (ii) a dispersed phase including the sulfonated polyaromatic catalyst as well as any non-hydrolyzed cellulosic material. The sulfonated polyaromatic cata- (Continued)

lyst includes a mixture of partially sulfonated polycyclic aromatic hydrocarbons that is substantially insoluble in the aqueous phase, thus providing it with an affinity for the water-insoluble cellulosic substrate where it preferentially exhibits its catalytic hydrolytic activity. The monosaccharide hydrolysis product can be recovered from the aqueous phase of the reaction mixture.

27 Claims, 2 Drawing Sheets

(58) Field of Classification Search
USPC ......................................................... 502/168
See application file for complete search history.

(56) References Cited

U.S. PATENT DOCUMENTS

| | | |
|---|---|---|
| 7,988,788 B2 | 8/2011 | Hilst |
| 8,765,938 B2 | 7/2014 | Hara et al. |
| 9,194,012 B2 | 11/2015 | Hamrick |
| 2009/0176979 A1 | 7/2009 | Hara et al. |
| 2010/0312008 A1 | 12/2010 | Kastner et al. |
| 2011/0094505 A1 | 4/2011 | Bulla et al. |
| 2011/0207922 A1 | 8/2011 | Kubo et al. |
| 2013/0047979 A1 | 2/2013 | Eyal et al. |
| 2015/0133569 A1 | 5/2015 | Gong et al. |
| 2015/0202607 A1 | 7/2015 | Geremia et al. |
| 2015/0238948 A1 | 8/2015 | Geremia |
| 2016/0032038 A1 | 2/2016 | Baynes et al. |
| 2016/0108074 A1 | 4/2016 | Hong |
| 2016/0151766 A1 | 6/2016 | Shioyama et al. |
| 2016/0237513 A1 | 8/2016 | Ramello et al. |

OTHER PUBLICATIONS

Alawi et al., Determination of polycyclic aromatic hydrocarbons (PAHs) in carbon black-containing plastic consumer products from the Jordanian market, Toxin Reviews, 37:269-77 (2017).

Hu et al., "1D lignin-based solid acid catalysts for cellulose-hydrolysis to glucose and nanocellulose", ACS Sustainable Chemistry & Engineering, 3:2566-74 (2015).

International Application No. PCT/US19/63138, International Search Report and Written Opinion, mailed Feb. 18, 2020.

Li et al., Hydroloysis of cellulose to glucose over carbon catalysts sulfonated via a plasma process in dilute acids, Green Chemistry, 19:4774-7 (2017).

NewsRx article "Acyclic Hydrocarbons; Data on Acyclic Hydrocarbons Reported by Researchers at Nippon Dental University", Chemicals & Chemistry, Apr. 21, 2017: 573.

* cited by examiner

METHODS FOR CELLULOSE HYDROLYSIS USING SULFONATED POLYAROMATIC CATALYSTS

CROSS-REFERENCE TO RELATED APPLICATIONS

This is a National Stage of International Application No. PCT/US19/63138, filed Nov. 26, 2019 (incorporated herein by reference in its entirety), which claims priority to U.S. Provisional Application No. 62/771,352 (filed Nov. 26, 2018), each of which is incorporated herein by reference in its entirety.

STATEMENT OF GOVERNMENT INTEREST

None.

BACKGROUND OF THE DISCLOSURE

Field of the Disclosure

The disclosure relates to a method for hydrolyzing cellulosic material using a sulfonated polyaromatic catalyst. A cellulosic material is combined with the sulfonated polyaromatic catalyst in water to at least partially hydrolyze the water-insoluble cellulosic material and to form a water-soluble monosaccharide hydrolysis product. The sulfonated polyaromatic catalyst includes a mixture of partially sulfonated polycyclic aromatic hydrocarbons that is substantially insoluble in an aqueous reaction phase.

SUMMARY

In one aspect, the disclosure relates to a method for hydrolyzing cellulosic material, the method comprising: admixing a cellulosic material with a sulfonated polyaromatic catalyst (e.g., multicomponent polycyclic aromatic hydrocarbon (PAH) mixture such as bitumen, etc.) in water under temperature and pressure sufficient to at least partially hydrolyze the cellulosic material and to form a monosaccharide hydrolysis product (e.g., glucose), thereby providing a reaction mixture comprising (i) an aqueous phase comprising the water and the monosaccharide hydrolysis product in solution therein, and (ii) a dispersed phase comprising the sulfonated polyaromatic catalyst; and, recovering the monosaccharide hydrolysis product from the aqueous phase of the reaction mixture.

In a more particular aspect, the disclosure relates to a method for hydrolyzing cellulosic material, the method comprising: admixing a cellulosic material with a sulfonated polyaromatic catalyst (e.g., a single sulfonated polyaromatic material or a multicomponent polycyclic aromatic hydrocarbon (PAH) mixture) in water at a temperature ranging from about 100° C. to about 180° C. and a pressure sufficient to prevent water evaporation to at least partially hydrolyze the cellulosic material and to form a glucose hydrolysis product, thereby providing a reaction mixture comprising (i) an aqueous phase comprising the water and the glucose hydrolysis product in solution therein, and (ii) a dispersed phase comprising the sulfonated polyaromatic catalyst; and, recovering the glucose hydrolysis product from the aqueous phase of the reaction mixture.

The sulfonated polyaromatic catalyst can comprise a mixture of partially sulfonated (or sulfonate-containing) polycyclic aromatic hydrocarbons that is substantially insoluble in the aqueous phase, for example comprising partially sulfonated bitumen or a fraction thereof. The catalyst mixture can include at least some polycyclic aromatic hydrocarbons including a sulfonate or sulfonic acid functional group (e.g. $-SO_3H$ or $-SO_3^-$, with a counter ion such as Li, Na, or K). The catalyst mixture can further include at least some polycyclic aromatic hydrocarbons with no sulfonate/sulfonic functionality. The catalyst mixture can include polycyclic hydrocarbons with heteroaromatic cycles and/or non-aromatic cycles in addition to aromatic cycles. Such additional heteroaromatic cycles and/or non-aromatic cycles can be present in species with aromatic cycles (e.g., fused polycyclic hydrocarbons including aromatic cycles along with heteroaromatic cycles and/or non-aromatic cycles). Such additional heteroaromatic cycles and/or non-aromatic cycles can be present in species without aromatic cycles (e.g., fused polycyclic hydrocarbons including heteroaromatic cycles and/or non-aromatic cycles, but without aromatic cycles). Examples of heteroaromatic cycles include pyrrole, pyridine, imidazole, furan, thiophene, and their condensed derivatives. Examples of non-aromatic cycles include quinones, cyclohexane or other cycloalkane. The polycyclic hydrocarbons and their corresponding cycles, whether aromatic, heteroaromatic, or non-aromatic, can be substituted by one or more groups such as alkyl, acyl, carboxylate, etc.

The aqueous phase of the reaction mixture is generally a continuous phase primarily including water and the monosaccharide hydrolysis product dissolved therein. The dispersed phase of the reaction mixture generally includes the water-insoluble sulfonated PAH mixture catalyst dispersed throughout the continuous phase. The dispersed phase can further include unreacted/non-hydrolyzed cellulosic material, which is also water-insoluble and can be present as dispersed solids throughout the continuous phase. Some or all of the sulfonated PAH mixture catalyst can be adsorbed on the remaining cellulosic material.

The sulfonated polyaromatic catalyst can be substantially water-insoluble such that not more than 5, 2, 1, 0.1, or 0.01 wt. % of the catalyst can be dissolved/soluble in water/aqueous phase. Alternatively or additionally, at least 95, 98, 99, 99.9, or 99.99 wt. % of the catalyst can be present in the dispersed phase.

Various refinements of the disclosed methods for hydrolyzing cellulosic material are possible.

In a refinement, the polycyclic aromatic hydrocarbons have at least 3 aromatic units. The polycyclic aromatic hydrocarbons can have at least 3, 4, 5, or 6 fused cyclic units 3 and/or up to 4, 5, 6, 7, 8, 9, or 10 or more fused cyclic units, for example fused aromatic, heteroaromatic, and/or non-aromatic cyclic units. The polycyclic aromatic hydrocarbons generally have a distribution of species having different numbers of aromatic or cyclic units, some or all of which are generally fused together. Suitably, at least 80, 90, 95, or 99 wt. % or mol.% of the polycyclic aromatic hydrocarbons present in the mixture have at least 3, 4, 5, or 6 fused cyclic units 3 and/or up to 4, 5, 6, 7, 8, 9, or 10 or more cyclic units. Polycyclic aromatic hydrocarbons with at least 4 or 5 cyclic units and a sulfonate group, for example with 4 to 9 cyclic units and one or two sulfonate groups, are particularly suitable for providing a substantially water-insoluble species with at least some catalytic activity for hydrolysis. The base distribution of polycyclic aromatic hydrocarbons generally has at least some sulfonated species, with the sulfonated and non-sulfonated species of the distribution collectively corresponding to the mixture of partially sulfonated polycyclic aromatic hydrocarbons and/or sulfonated polyaromatic catalyst. The base distribution of polycyclic aromatic hydrocarbons has at least some sulfonated species, which are primarily responsible for hydrolytic activity.

In a refinement, the polycyclic aromatic hydrocarbons are selected from the group consisting of triphenylene, tetraphenylene, pentaphenylene, tetracene, pentacene, hexacene, heptacene, octacene, nonacene, decacene, condensed derivatives thereof (e.g., chrysene, pyrene, benzopyrene, perylene), quinone derivatives thereof, hydroxylated derivatives thereof, alkylated derivatives thereof, carbonylated derivatives thereof, carboxylated derivatives thereof, and combinations thereof. The base distribution of polycyclic aromatic hydrocarbons has at least some sulfonated species, with the sulfonated and non-sulfonated species of the distribution collectively corresponding to the mixture of partially sulfonated polycyclic aromatic hydrocarbons and/or sulfonated polyaromatic catalyst.

In a refinement, the mixture of partially sulfonated polycyclic aromatic hydrocarbons has a degree of sulfonation of about 10 wt. % to about 20 wt. %. For example, the partially sulfonated polycyclic aromatic hydrocarbons can have a degree of sulfonation of at least about 10, 12, 14, or 16 wt. % and/or up to about 14, 16, 18, or 20 wt. %, where the weight fraction/percent corresponds to a ratio of the mass of sulfonate groups relative to the polycyclic substrate that it sulfonates (e.g., determined as weight of sulfuric acid used to sulfonate a polycyclic aromatic hydrocarbon mixture).

In a refinement, the polycyclic aromatic hydrocarbons in the mixture of partially sulfonated polycyclic aromatic hydrocarbons are also at least partially oxidized. Partial oxidation introduces one or more carbon-oxygen groups into the PAH substrates, for example carbonyl-containing groups such as ketone, aldehyde, carboxylic, or carboxylate groups, which can provide some hydrophilic character for compatibility with the hydroxyl groups of the cellulosic substrate. In addition, partial oxidation treatment can remove or shorten the alkyl chains present on the PAH substrates that would otherwise diminish the affinity of the substance for cellulose.

In a refinement, the sulfonated polyaromatic catalyst is present in the reaction mixture in an amount ranging from about 0.5 wt. % to about 5 wt. %, based on the total weight of the reaction mixture. For example, the reaction mixture suitably contains at least about 0.5, 1, 2, or 3 wt. % and/or up to about 2, 3, 4, or 5 wt. % of catalyst. The particular amount of catalyst (e.g., sulfonated bitumen or otherwise) per unit weight of cellulosic material can be selected in view of the cellulose/water ratio in a given reaction mixture, which in turn can be selected or otherwise limited by high viscosity of the pulps containing high levels of cellulose (cellulosic biomass).

In a refinement, the cellulosic material is present in the reaction mixture in an amount ranging from about 5 wt. % to about 90 wt. %, based on the total weight of the reaction mixture. For example, the reaction mixture suitably contains at least about 5, 7, 10, 12, or 15 wt. % and/or up to about 10, 12, 15, 17, 20, 25, 30, 40, 50, 60, 70, 80, or 90 wt. % cellulosic material. The viscosity of the pulps with cellulose concentration above about 25 wt. % can be relatively high, such that the mixtures not easily flowable. Accordingly, reactions performed in a mixed/stirred or otherwise flowing reactor suitably have a concentration of up to 25 wt. % cellulosic material. In other embodiments where the reaction is performed in a solid or other substantially non-flowing state, the reaction mixture can have substantially less water, for example an approximately stoichiometric amount of one water molecule per glycoside unit (e.g., corresponding to about 90 wt. % cellulose and 10 wt. % water).

In a refinement, the weight ratio of the sulfonated polyaromatic catalyst to the cellulosic material in the reaction mixture is in a range of about 1:5 to about 1:100. For example, the weight ratio of the sulfonated polyaromatic catalyst to the cellulosic material can be at least about 1:5, 1:7, 1:10, 1:12 and/or up to about 1:10, 1:12, 1:15, 1:20, 1:40, 1:60, or 1:100.

In a refinement, the cellulosic material is obtained from a lignocellulosic biomass. Example lignocellulosic biomass can include pretreated poplar or other woody lignocellulosic biomass (e.g., from tree-based lignocellulosic biomass). Other lignocellulosic sources can include (waste) paper, crop residues, grass, corn stover, any kind of pretreated or non-pretreated wood, etc.

In a refinement, the monosaccharide hydrolysis product is selected from the group consisting of glucose, xylose, mannose, galactose, rhamnose, arabinose, and combinations thereof. Glucose is a preferred/predominant hydrolysis product from cellulose as a cellulosic material. Glucose as well as the others can be hydrolysis products from hemicellulose as a cellulosic material.

In a refinement, the cellulosic material comprises at least one of cellulose and hemicellulose. Cellulose is generally a preferred cellulosic substrate (e.g., the only cellulosic substrate), in particular when it is desired to form C6 carbohydrates. In embodiments where it is desirable to form C5 and C6 carbohydrates (e.g., as a mixture), hemicellulose is a suitable cellulosic substrate, for example as the only cellulosic substrate or in combination with cellulose.

In a refinement, the method comprises performing the admixing in a pressurized vessel. More particularly, the method can include heating up to a reaction temperature in the pressurized vessel, while maintaining autogenous pressure. The pressure in the vessel is sufficiently high to prevent boiling of the reaction mixture at the (elevated) reaction temperature.

In a refinement, the method comprises performing the admixing at a temperature of about 100° C. to about 180° C., for example at least about 100, 110, 120, 130, 140, 150, 155, 160 or 165° C. and/or up to about 155, 160, 165, 170, 175, or 180° C.

In a refinement, the method comprises performing the admixing for about 3 to about 48 hours, for example at least about 3, 6, 12, 18, 20, 24, or 30 hours and/or up to about 30, 36, 40, 42, or 48 hours.

In a refinement, the method comprises performing the admixing under acidic conditions, for example at a pH of no greater than about 5, 4, 3, or 2. The acidity or reaction mixture pH value may be due to the sulfonic acid groups, acetic acid, low-molecular weight sulfonic acids, levulinic acid, etc.

In a refinement, about 5 wt. % to about 95 wt. % of the initial cellulose material is converted the monosaccharide hydrolysis product. For example, at least about 5, 10, 15, 20, 25, 30 wt. % and/or up to about 25, 30, 35, 40, 45, 50, 60, 70, 80, 90 or 95 wt. % of the cellulosic material is converted to glucose or other corresponding monosaccharide hydrolysis products, based on the initial weight of the cellulosic material.

In a refinement, the aqueous phase of the reaction mixture is substantially free of the sulfonated polyaromatic catalyst. For example, the aqueous phase can contain the sulfonated polyaromatic catalyst in an amount no greater than about 5, 3, 2, 1, 0.5, or 0.1 wt. %, based on the total weight of the aqueous phase.

In a refinement, the monosaccharide hydrolysis product is substantially free of the sulfonated polyaromatic catalyst.

For example, the monosaccharide hydrolysis product can comprise the sulfonated polyaromatic catalyst in an amount no greater than about 5, 3, 2, 1, 0.5, or 0.1 wt. %, based on the total weight of the monosaccharide hydrolysis product.

In a refinement, the method further comprises: recovering the sulfonated polyaromatic catalyst from the reaction mixture; admixing a second cellulosic material (e.g., an additional batch of cellulosic material) with the recovered sulfonated polyaromatic catalyst in water to provide a second reaction mixture having an aqueous phase and a dispersed phase; and, recovering a second monosaccharide hydrolysis product from the aqueous phase of the second reaction mixture. The disclosed process can be repeated any number of times, for example at least 2, 3, or 4 and/or up to 3, 4, or 5 times, each time with a new cellulosic material). Thus, the disclosure further relates to a recycle process for recovering the sulfonated polycyclic aromatic hydrocarbon catalyst, which can be re-used to catalyze the hydrolysis of second and subsequent batches of other cellulosic material(s). The concentration and component properties for the second reaction, as well as the corresponding reaction conditions and products, can generally be the same as above for the base process.

In a refinement, the mixture of partially sulfonated polycyclic aromatic hydrocarbons is selected from the group consisting of partially sulfonated bitumen, partially sulfonated tar, partially sulfonated pitch, partially sulfonated creosote, fractions thereof, and combinations thereof.

In a refinement, the mixture of partially sulfonated polycyclic aromatic hydrocarbons comprises partially sulfonated bitumen.

In a refinement, the mixture of partially sulfonated polycyclic aromatic hydrocarbons comprises a fraction of partially sulfonated bitumen, for example a water-insoluble fraction of partially sulfonated bitumen, such as the fraction remaining after a water extraction of partially sulfonated bitumen. The mixture of partially sulfonated polycyclic aromatic hydrocarbons likewise can include a fraction of other partially sulfonated materials, such as tar, pitch, creosote, etc. In a further refinement, the fraction of partially sulfonated bitumen or other partially sulfonated materials excludes at least one of non-aromatic components and low molecular weight components from the polycyclic aromatic hydrocarbons of the partially sulfonated bitumen or other partially sulfonated materials, such as acetic acid, DCM, water, and/or other acids. In a particular further refinement, the fraction is a water-insoluble fraction (e.g., having been exposed to a water extraction to remove the water-soluble components of the base bitumen or other composition). Suitably, the water-soluble low molecular weight sulfonated species are removed from the sulfonated bitumen or other sulfonated material so that the remaining water-insoluble acids exhibit higher affinity for cellulose. Also, removal the water-soluble components prevents them from catalyzing the parasitic degradation of glucose hydrolysis product in the aqueous solution. The removal of the low-molecular weight species increases the average molecular weight of the remaining mixture.

While the disclosed methods, apparatus, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawing wherein.

DETAILED DESCRIPTION

The disclosure relates to a method for hydrolyzing cellulosic material using a sulfonated polyaromatic catalyst. A cellulosic material is combined with the sulfonated polyaromatic catalyst in water to at least partially hydrolyze the cellulosic material and to form a monosaccharide hydrolysis product, thereby forming a reaction mixture including (i) a (continuous) aqueous phase including water with the monosaccharide hydrolysis product in solution therein, and (ii) a dispersed phase including the sulfonated polyaromatic catalyst as well as any non-hydrolyzed cellulosic material. The sulfonated polyaromatic catalyst includes a mixture of partially sulfonated polycyclic aromatic hydrocarbons that is substantially insoluble in the aqueous phase, thus providing it with an affinity for the water-insoluble cellulosic substrate where it preferentially exhibits its catalytic hydrolytic activity. The monosaccharide hydrolysis product can be recovered from the aqueous phase of the reaction mixture. Catalytic hydrolysis in a water-insoluble dispersed phase to form a water-soluble monosaccharide hydrolysis product facilitates both (i) recovery of the monosaccharide hydrolysis product from the aqueous phase which is already separated from sulfonated polyaromatic catalyst, and (ii) recovery/reuse of the sulfonated polyaromatic catalyst in a subsequent process to hydrolyze further cellulosic material.

Plant biomass represents a substantial reservoir of renewable carbon and has a production estimate of 105 billion metric tons per year worldwide. Cellulose, comprising about 40% of the plant biomass (i.e., about 40 billion tons per year worldwide) is an attractive immediate precursor to glucose. Once released in free form, glucose can be used as feed for animals and microorganisms and as a starting material for conversion into fuels and chemicals.

However, the efficient packing of the glucoside residues in the cellulose crystallites makes cellulose a rather insoluble and thus a relatively inert biological material. In particular, the hydrogen atoms in the axial positions in cellulose can render portions of the cellulose polymeric molecules hydrophobic. The polar hydroxyl groups occupy equatorial positions, and form hydrogen bonds with neighboring molecules via interstrand hydrogen bonds. The crystalline cellulose regions are also surrounded by amorphous zones, which can directly contact the solvent.

Thus, the hydrolysis of cellulose is economically and enzymatically difficult. Cellulose can be partially hydrolyzed by dilute aqueous acids. However, in this case only its amorphous fragments can react, leaving the majority of the cellulose glucoside residues inside of the crystallites to which the acids do not have access. In some cases, the hydrolysis rate can be increased by increasing temperature. However, the high temperature also increases the rate of degradation of the released glucose molecules that are fully exposed to the acid in solution. Thus, the result is a decrease in the overall glucose yield.

To enable the acid to access all the glucoside units, cellulose can be dissolved in 70% aqueous sulfuric acid or 85% phosphoric acid, precipitated in amorphous form via dilution with water, and later hydrolyzed with dilute (3%) sulfuric acid in hot aqueous solution. To decrease the viscosity of the cellulose solutions to a level that enables processing, significant amounts of the acid (such as 9 vol 70% $H_2SO_4$:1 vol cellulose) are required. While this procedure has been known for decades, the problems related to subsequent sulfuric acid recovery and/or neutralization make the corresponding industrial synthesis of cellulosic glucose are cost-inefficient.

The ability of ionic liquids (ILs) to dissolve cellulose has led to a wide interest in their use as solvents for cellulose transformations. Representative examples are 2-butyl-5-methylimidazolium acetate and chloride. However, the high cost and significant amounts of the ILs required to create solutions of acceptably low viscosity and the associated recovery issues have so far deterred large-scale use of ILs from the industrial biomass processing.

In yet another approach, cellulose has been hydrolyzed with solid acids, such as sulfonated carbon or layered niobium molybdate solid acid $HNbMoO_6$. Solid acids have the advantage that they can be easily separated from the hydrolysis solutions and recycled. Unfortunately, the use of solid acids suffers from poor contact with the solid cellulose. One strategy to improve contact is ball-milling, a time-and energy-intensive step for the cellulose preactivation. However, such mechanochemical treatment mostly yields polysaccharides, requiring a second step of treatment with dilute aqueous acid to hydrolyze the oligomers. Also, the energy required for the mechanical grinding is comparable to that in the biomass itself, so that this approach is not economical.

Another strategy to transport the cellulose molecules to a solid catalyst's acidic sites is to mobilize them in ILs or under hydrothermal conditions. Such methods enable sulfonated carbons, synthesized as 3-dimensional mesoporous materials, to catalyze cellulose hydrolysis. Besides their acidity, their catalytic activity in such polar phases can be ascribed to the affinity of the hydrophobic carbon regions for the hydrophobic cellulose fragments. However, transport of the insoluble cellulose to the solid catalyst active sites remains difficult; to solubilize and mobilize even the shortest cellulose oligomers requires substantial heating, resulting in significant degradation of the freed glucose. Also, this process alone does not address the problem of the IL recovery.

Thus, provided herein is a method for hydrolyzing cellulosic material. The method includes admixing a cellulosic material with a sulfonated polyaromatic catalyst in water. The sulfonated polyaromatic catalyst includes a mixture of partially sulfonated polycyclic aromatic hydrocarbons that is substantially insoluble in the aqueous phase. The admixing can be carried out under temperature and pressure sufficient to at least partially hydrolyze the cellulosic material and to form a monosaccharide hydrolysis product. This provides a reaction mixture including an aqueous phase with the water and the monosaccharide hydrolysis product in solution, and a dispersed phase with the sulfonated polyaromatic catalyst. The method also includes recovering the monosaccharide hydrolysis product from the aqueous phase of the reaction mixture. Recovering the monosaccharide hydrolysis product can be done using any suitable means generally known in the art, such as by removal of the insoluble materials (e.g., the starting cellulose, lignocellulosic material, biomass, catalyst, organic decomposition products, and others; such as by filtration), followed by solvent removal via distillation, evaporation, and the like. The method can further include recovering the sulfonated polyaromatic catalyst from the reaction mixture, for example to recycle or re-use the catalyst, which recovery can likewise can be done using any suitable means generally known in the art, such as extraction, dissolution at high temperature followed by precipitation at low temperature, absorption on fresh lignocellulosic material, filtration, decanting, settling, and the like.

Figure 1:
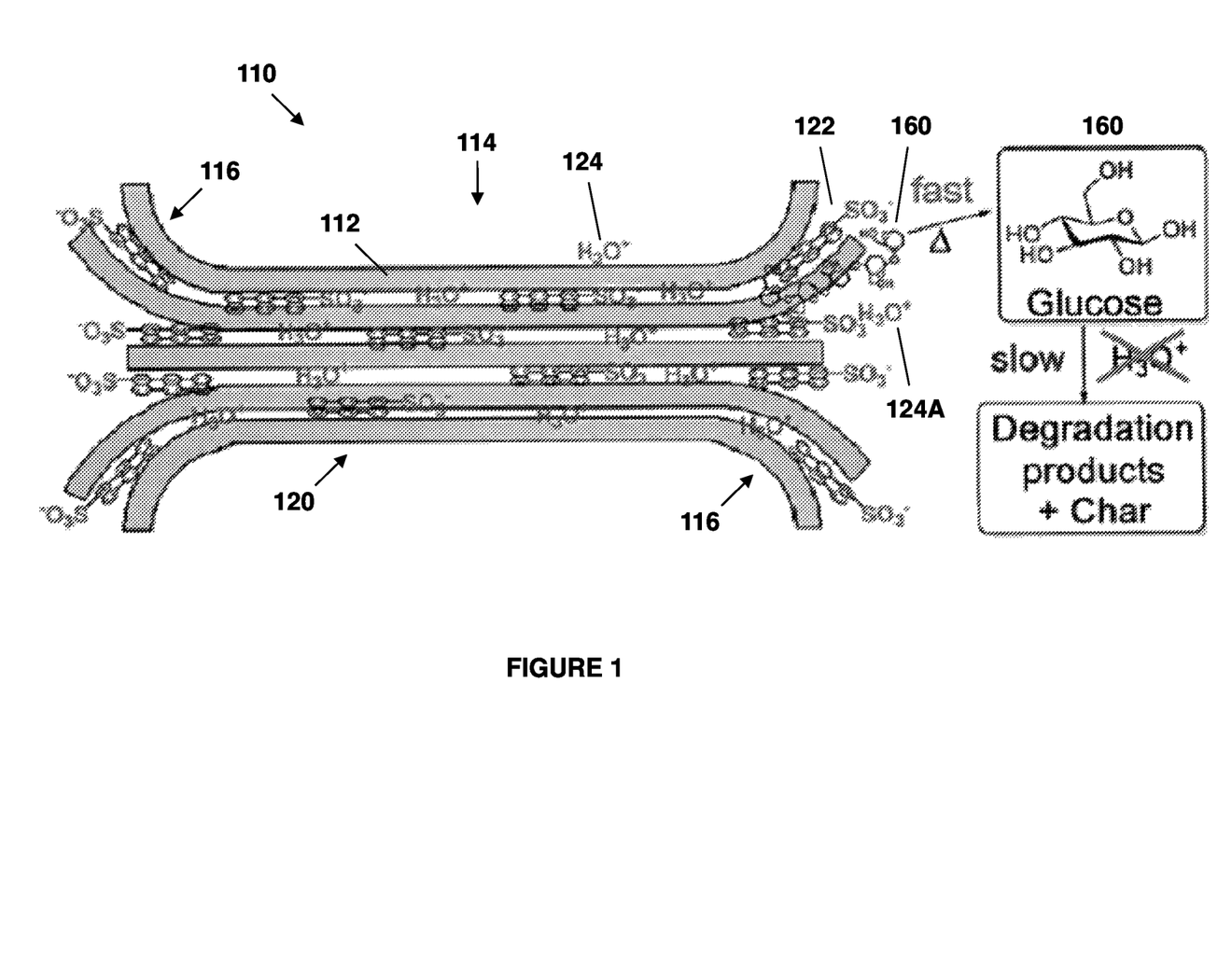
FIG. 1 is an illustration of hydrolysis of a cellulosic material catalyzed by a sulfonated polyaromatic catalyst, as described herein.

FIG. 1 qualitatively illustrates hydrolysis of a cellulosic material 110 according to the disclosure. The cellulosic material 110 includes a plurality of crystallites 112 with interstitial areas between adjacent crystallites 112. The cellulosic material 110 generally includes a central crystalline region 114 with amorphous regions 116 at the ends of the crystallites 112. A sulfonated polyaromatic catalyst 120 includes an arylsulfonic acid with an arylsulfonate (anionic) portion 122 and an acid or proton portion 124. Without intending to be bound by theory, it is believed that the sulfonate groups of the poorly soluble sulfonated polyaromatic catalysts 120, described herein, deprotonate upon contact with water, resulting in sulfonate ions 122 that repel each other and acid groups 124. At the same time, the large size of the aromatic groups are expected to lead to substantial hydrophobic interactions. It is believed that those interactions would reduce the solubility of the arylsulfonic acids and thus keep the concentration of the free arylsulfonate ions 122, as well as protons 124, low in solution in the bulk water phase of the hydrolysis mixture. However, the ions 122, 124 that do dissolve in water can diffuse and intercalate into cellulose 110 in between adjacent crystallites 112 due to the hydrophobic interactions with cellulose axial C—H bonds. The rigid planar geometry of the polyaromatic rings is expected to favor the intercalation process. The sulfonate ions 122 can also attract hydronium ions 124 into the cellulose 110, thereby disorganizing the cellulose material 110 even more and effectively dissolving the hydrated acid in cellulose 110.

The acid molecules 124A, residing in the cellulose amorphous sites, can catalyze cellulose hydrolysis into monosaccharides 160 and polysaccharides, which can diffuse out into the aqueous phase. However, given the low acid concentration in solution, and the polarity of glucose molecules, the rate of subsequent acid-catalyzed glucose degradation is expected to be slower than with a water-soluble acid. Thus, the methods of the disclosure can result in a larger final glucose concentration in solution. This concept is displayed in FIG. 1.

Figure 2:
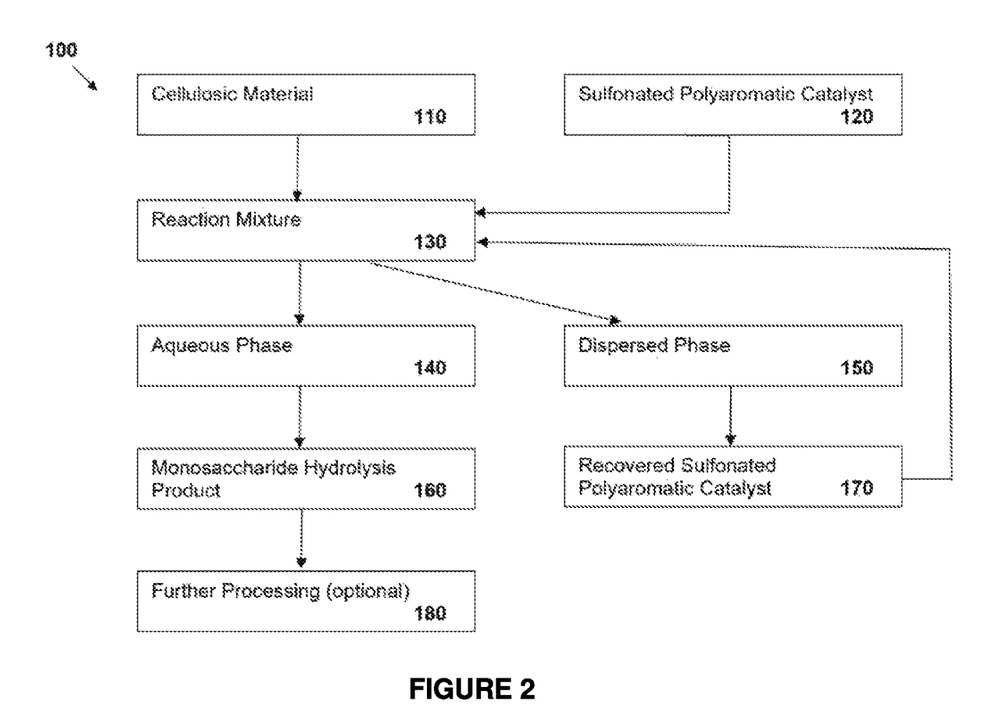
FIG. 2 is a flow chart illustrating a method for hydrolysis of a cellulosic material catalyzed by a sulfonated polyaromatic catalyst according to the disclosure.

FIG. 2 illustrates a general method 100 for hydrolyzing a cellulosic material according to the disclosure. A cellulosic material 110 and a sulfonated polyaromatic catalyst 120, for example sulfonated bitumen, are initially mixed or otherwise combined in water, for example by being continuously fed or batch-wise charged to a suitable reaction vessel, for example a pressurized vessel, to hydrolyze the cellulosic material 110. The cellulosic material 110 and sulfonated polyaromatic catalyst 120 are admixed under a temperature and pressure sufficient to at least partially hydrolyze the cellulosic material 110 in a reaction mixture 130. Suitable reaction/hydrolysis 130 conditions can include temperatures ranging from about 100-180° C. and reaction times (or mean residence times for continuous processes) up to about 48 hr. The reaction mixture 130 includes an aqueous phase 140 and a dispersed phase 150. The aqueous phase 140 includes water and a monosaccharide hydrolysis product 160 such as glucose that results from the at least partial hydrolysis of the cellulosic material 110. The dispersed phase 150 includes the sulfonated polyaromatic catalyst 120. The monosaccharide hydrolysis product 160 is recovered from the aqueous phase 140 of the reaction mixture 130. Optionally, the monosaccharide hydrolysis product 160 can undergo further processing 180, such as to provide materials, food, fodder, biofuels, or other bioproducts. In some cases, the sulfonated polymeric catalyst 120 can be recovered from the dispersed phase 150 of the reaction mixture 130 to provide a recovered sulfonated polyaromatic catalyst 170. The recovered polyaromatic catalyst 170 can be admixed with a second cellulosic material to provide a second reaction mixture having an aqueous phase and a dispersed phase. A second monosaccharide hydrolysis product can be recovered from the aqueous phase of the second reaction mixture.

Cellulosic Material

As provided herein, the disclosure relates to methods for hydrolyzing a cellulosic material. The source of the cellulosic material is not particularly limited. For example, in embodiments, the cellulosic material can be obtained from a lignocellulosic biomass. Suitable lignocellulosic biomasses can include, but are not limited to, pretreated poplar or other woody lignocellulosic biomass (e.g., from tree-based lignocellulosic biomass), grass, switchgrass, rice hull, husk, stalk, cob, softwood, hardwood, or any other plant suitable for cellulose hydrolysis. In embodiments, the lignocellulosic biomass includes a wood-based biomass (e.g., a softwood or a hardwood). In embodiments, the lignocellulosic biomass includes poplar (i.e., a hardwood). Examples of poplar include, for example, poplar NM6 and poplar DN-34. Other lignocellulosic sources can include (waste) paper, crop residues, corn stover, any kind of pretreated or non-pretreated wood, etc.

The cellulosic material can include at least one of cellulose and hemicellulose. In embodiments, the cellulosic material includes cellulose. In embodiments, the cellulosic material includes hemicellulose. In embodiments, the cellulosic material includes cellulose and hemicellulose. In embodiments, the cellulosic material can be substantially free of hemicellulose. In embodiments, the cellulosic material can be substantially free of cellulose. As used herein, the terms "substantially free of cellulose" and/or "substantially free of hemicellulose" mean that the cellulosic material can suitably contain less than about 5 wt %, 4 wt %, 3 wt %, 2 wt %, 1 wt %, 0.5 wt %, 0.1 wt %, or 0.01 wt % of the cellulose or hemicellulose, based on the total weight of the cellulosic material.

The cellulosic material can be present in the reaction mixture in an amount ranging from about 5 wt. % to about 90 wt %, for example at least about 5, 7, 10, 12, or 15 wt. % and/or up to about 10, 12, 15, 17, 20, 25, 30, 40, 50, 60, 70, 80, or 90 wt % based on the total weight of the reaction mixture.

The viscosity of certain pulps having a cellulose concentration above about 25 wt. % can be relatively high, such that the mixtures not easily flowable. Accordingly, reactions performed in a mixed/stirred, for example at the laboratory scale, or otherwise flowing reactor can have a concentration of up to 25 wt. % cellulosic material. In embodiments where the reaction is performed in a solid or other substantially non-flowing state, for example in some industrial scale reactors, the reaction mixture can have substantially less water, for example an approximately stoichiometric amount of one water molecule per glycoside unit. For example, the reaction mixture can include about 90 wt. % cellulose and 10 wt. % water.

Sulfonated Polyaromatic Catalyst

The disclosure provides methods of hydrolyzing cellulosic material including admixing a cellulosic material with a sulfonated polyaromatic catalyst. The sulfonated polyaromatic catalyst can include a mixture of partially sulfonated polycyclic aromatic hydrocarbons, for example a multicomponent polycyclic aromatic hydrocarbon (PAH) mixture such as sulfonated bitumen. The mixture of partially sulfonated polycyclic aromatic hydrocarbons can be substantially insoluble in water.

In embodiments, the polycyclic aromatic hydrocarbons have at least 3 aromatic units. For example, the polycyclic aromatic hydrocarbons can have at least 3, 4, 5, or 6 fused cyclic units and/or up to 4, 5, 6, 7, 8, 9, or 10 or more fused cyclic units, for example fused aromatic, heteroaromatic, and/or non-aromatic cyclic units. Examples of suitable polycyclic aromatic hydrocarbons having at least 3 aromatic units include, but are not limited to, those having anthracene, phenanthrene, phenalene, tetracene, chrysene, triphenylene, pyrene, pentacene, benzopyrene, corannulene, benzoperylene, coronene, ovalene, and benzofluroene, and derivatives thereof. The polycylic aromatic hydrocarbon can also include naphthalene. In embodiments, the polycyclic aromatic hydrocarbons can include triphenylene, tetraphenylene, pentaphenylene, tetracene, pentacene, hexacene, heptacene, octacene, nonacene, decacene, condensed derivatives thereof, quinone derivatives thereof, hydroxylated derivatives thereof, alkylated derivatives thereof, carbonylated derivatives thereof, carboxylated derivatives thereof, and combinations thereof.

The mixture of partially sulfonated polycyclic aromatic hydrocarbons can include partially sulfonated bitumen, partially sulfonated tar, partially sulfonated pitch, partially sulfonated creosote, fractions thereof, or combinations thereof. In embodiments, the mixture of partially sulfonated polycyclic aromatic hydrocarbons includes partially sulfonated bitumen. In embodiments, the mixture of partially sulfonated polycyclic aromatic hydrocarbons includes a fraction of partially sulfonated bitumen. In embodiments, the fraction of partially sulfonated bitumen excludes at least one of non-aromatic components and low molecular weight components from the polycyclic aromatic hydrocarbons of the partially sulfonated bitumen. In embodiments, the fraction of partially sulfonated bitumen is a water-insoluble fraction. In embodiments, the mixture of partially sulfonated polycyclic aromatic hydrocarbons includes partially sulfonated tar. In embodiments, the mixture of partially sulfonated polycyclic aromatic hydrocarbons includes partially sulfonated pitch. In embodiments, the mixture of partially sulfonated polycyclic aromatic hydrocarbons includes partially sulfonated creosote.

The polycyclic aromatic hydrocarbons generally have a distribution of species having different numbers of aromatic or cyclic units, some or all of which are generally fused together. Suitably, at least 80, 90, 95, or 99 wt. % or mol.% of the polycyclic aromatic hydrocarbons present in the mixture have at least 3, 4, 5, or 6 fused cyclic units 3 and/or up to 4, 5, 6, 7, 8, 9, or 10 or more cyclic units. Polycyclic aromatic hydrocarbons with at least 4 or 5 cyclic units and a sulfonate group can be particularly suitable for providing a substantially water-insoluble species with at least some catalytic activity for hydrolysis. The base distribution of polycyclic aromatic hydrocarbons generally has at least some sulfonated species, with the sulfonated and non-sulfonated species of the distribution collectively corresponding to the mixture of partially sulfonated polycyclic aromatic hydrocarbons and/or sulfonated polyaromatic catalyst. The base distribution of polycyclic aromatic hydrocarbons has at least some sulfonated species, which are primarily responsible for hydrolytic activity.

The mixture of partially sulfonated polycyclic aromatic hydrocarbons can have a degree of sulfonation of about 10 wt % to about 20 wt %, for example at least about 10, 12, 14, or 16 wt. % and/or up to about 14, 16, 18, or 20 wt. %, where the weight fraction/percent corresponds to a ratio of the mass of sulfonate groups relative to the polycyclic substrate that it sulfonates. For example the weight fraction/percent can be determined as weight of sulfuric acid used to sulfonate a polycyclic aromatic hydrocarbon mixture.

In addition to being sulfonated, the polycyclic aromatic hydrocarbons can also be at least partially oxidized. Partial oxidation introduces one or more carbon-oxygen groups into the PAH substrates, for example carbonyl-containing groups such as ketone, aldehyde, carboxylic, or carboxylate groups, which can provide some hydrophilic character for compatibility with the hydroxyl groups of the cellulosic substrate. In addition, partial oxidation treatment can remove or shorten the alkyl chains present on the PAH substrates that would otherwise diminish the affinity of the substance for cellulose. In embodiments, the reaction mixture includes a sulfonated oxidized polyaromatic catalyst.

The sulfonated polyaromatic catalyst can be present in the reaction mixture in an amount ranging from about 0.5 wt. % to about 5 wt. %, for example at least about 0.5, 1, 2, or 3 wt. % and/or up to about 2, 3, 4, or 5 wt. % based on the total weight of the reaction mixture. The particular amount of catalyst, for example sulfonated bitumen or sulfonated oxidized bitumen, per unit weight of cellulosic material can be selected in view of the cellulose/water ratio in any given reaction mixture, which in turn can be selected or otherwise limited by high viscosity of the pulps containing high levels of cellulose, such as the lignocellulosic biomass.

The sulfonated polyaromatic catalyst can be substantially water-insoluble such that not more than 5, 2, 1, 0.1, or 0.01 wt. % of the catalyst can be dissolved and/or soluble in water or an otherwise aqueous phase. Alternatively or additionally, at least 95, 98, 99, 99.9, or 99.99 wt. % of the catalyst can be present in a dispersed phase.

The sulfonated polyaromatic catalyst and the cellulosic material can be present in the reaction mixture in a ratio ranging from about 1:5 to about 1:100, for example at least about 1:5, 1:7, 1:10, 1:12 and/or up to about 1:10, 1:12, 1:15, 1:20, 1:40, 1:60, or 1:100. Advantageously, when included in these ratios, the recovery of the monosaccharide hydrolysis product, such as glucose in some cases, can be at least about 40%

Monosaccharide Hydrolysis Product

Cellulose or hemicellulose can be hydrolyzed to provide a variety of monosaccharide hydrolysis products. Examples of suitable monosaccharide hydrolysis products include, but are not limited to glucose, xylose, mannose, galactose, rhamnose, arabinose, and combinations thereof. In embodiments, the monosaccharide hydrolysis product includes glucose. In embodiments, the monosaccharide hydrolysis product includes xylose. In embodiments, monosaccharide hydrolysis product includes galactose. In embodiments, monosaccharide hydrolysis product includes rhamnose. In embodiments, monosaccharide hydrolysis product includes arabinose. In embodiments, monosaccharide hydrolysis product includes two or more monosaccharide hydrolysis products, such as glucose and xylose.

In embodiments, about 5 wt. % to about 95 wt. % of the initial cellulose material is converted the monosaccharide hydrolysis product, such as glucose. For example, in embodiments, at least about 5, 10, 15, 20, 25, 30 wt. % and/or up to about 25, 30, 35, 40, 45, 50, 60, 70, 80, 90 or 95 wt. % of the cellulosic material is converted to glucose or other corresponding monosaccharide hydrolysis products, based on the initial weight of the cellulosic material.

Method of Hydrolyzing Cellulose

As described herein, the disclosure provides methods for hydrolyzing cellulosic material. The method includes admixing the cellulosic material, as described herein, with a sulfonated polyaromatic catalyst, as described herein in water. The amount of water in the reaction mixture should be suitable to provide a reaction mixture with an appropriate viscosity. That is, when the pulps including the cellulose are substantially high, additional water can be added, so long as the ratios and other amounts for the catalyst and cellulosic material described herein are satisfied.

The admixing can be carried out under temperature and pressure sufficient to at least partially hydrolyze the cellulosic material and to form a monosaccharide hydrolysis product.

The admixing can be performed at a temperature in a range of about 100° C. to about 180° C., for example, at least about 100, 110, 120, 130, 140, 150, 155, 160 or 165° C. and/or up to about 155, 160, 165, 170, 175, or 180° C. In embodiments, the method comprises performing the admixing at a temperature of at least about 150° C. In embodiments, the method comprises performing the admixing at a temperature of up to about 180° C. While cellulosic hydrolysis can occur at temperatures of about 100° C., the reaction generally proceeds at a slower rate, thereby lengthening the time of the reaction. If a temperature of 100° C. is used for the reaction, other parameters, such as pressure, can be suitably adjusted to modify the overall reaction time.

The admixing can be performed at a pressure sufficient to at least partially hydrolyze the cellulosic material. In embodiments, the admixing is performed in a pressurized vessel. The pressure in the pressurized vessel can be at or above a sum of the vapor pressure of the water, and the pressure of air or other gas filling the reactor space above the liquids, catalyst(s) and biomass. In embodiments, the method can include heating up to a reaction temperature in the pressurized vessel, while maintaining autogenous pressure. The pressure in the vessel can sufficiently high to prevent boiling of the reaction mixture at the reaction temperature.

The admixing can be performed for a period of time sufficient to at least partially hydrolyze the cellulosic material. In embodiments, the admixing can be performed for up to about 48 hours. For example, in embodiments, the admixing can be performed for at least about 3 to about 48 hours, for example at least about 3, 6, 12, 18, 20, 24, or 30 hours and/or up to about 30, 36, 40, 42, or 48 hours. The period of time necessary to perform the hydrolysis is dependent on the pressure, temperature, and manufacturing equipment used. For example, using industrial-scale equipment, the hydrolysis may be completed in a shorter period of time than it would be if using lab-scale equipment. The period of time of the reaction suitably is sufficiently long to ensure that the reaction homogeneously and efficiently thermalizes. Performing the reaction too quickly may require an increased local temperature that can undesirably decompose the cellulosic material and leave the rest of the material cold, thus diminishing the yield. Furthermore, high temperatures can lead to high vapor pressure and high equipment cost.

The method provides a reaction mixture including two phases—an aqueous phase and a dispersed phase. The aqueous phase generally includes the water and the monosaccharide hydrolysis product, such as glucose. The monosaccharide hydrolysis product can be provided in solution with the water (e.g., it can be dissolved in the water). The dispersed phase generally includes the sulfonated polyaromatic catalyst, e.g., sulfonated bitumen.

The aqueous phase of the reaction mixture can be substantially free of the sulfonated polyaromatic catalyst. As used herein, the term "substantially free of the sulfonated polyaromatic catalyst" means that the aqueous phase can contain the sulfonated polyaromatic catalyst in an amount no greater than about 5, 3, 2, 1, 0.5, or 0.1 wt. %, based on the total weight of the aqueous phase.

The monosaccharide hydrolysis product can be substantially free of the sulfonated polyaromatic catalyst. That is, the monosaccharide hydrolysis product can contain the sulfonated polyaromatic catalyst in an amount no greater than about 5, 3, 2, 1, 0.5, or 0.1 wt. %, based on the total weight of the monosaccharide hydrolysis product.

The admixing can be performed under acidic conditions. For example, the admixing can be performed at a pH of no greater than about 5, 4, 3, or 2. The acidity or reaction mixture pH value may be due to the sulfonic acid groups, acetic acid, low-molecular weight sulfonic acids, levulinic acid, etc. that are present in the reaction mixture as degradation or byproducts of the hydrolysis of the cellulosic material.

The method further includes recovering the sulfonated polyaromatic catalyst from the reaction mixture, admixing a second cellulosic material with the recovered sulfonated polyaromatic catalyst in water to provide a second reaction mixture having an aqueous phase and a dispersed phase, and, recovering a second monosaccharide hydrolysis product from the aqueous phase of the second reaction mixture. That is, the method advantageously provides for the recycling and reuse of the sulfonated polyaromatic catalyst at least one, two, three, four, or five times.

EXAMPLES

Materials

Bitumen, grade PG 58-28 was obtained from Marathon. Sulfuric acid (95-98%) was purchased from CCI. Cellulose (20 micron powder) was purchased from Aldrich. Other chemicals were purchased from Sigma-Aldrich unless specifically mentioned otherwise.

Example 1

Preparation and Evaluation of Sulfonated Bitumen Catalysts
Bitumen Sulfonation

Bitumen (8.85 g), dichloromethane (DCM, 14.2 g) and chloroform (31.3 g) were placed into a 100 mL flask. Acetic anhydride (10 mL) was then added to the solution and stirred until all the bitumen dissolved to yield a stock solution of bitumen.

Sulfuric acid (2.203 g) was added to 10 mL of acetic anhydride with cooling to 0° C. to prepare acetate sulfate. The resulting mixture was added dropwise to the bitumen solution with ice cooling. Addition of the reaction mixture to 3% solution of $BaCl_2$ in water did not lead to precipitation of $BaSO_4$, which was taken as verification of the completion of the sulfonation reaction, that is, that all sulfate moieties had been converted.

Soot Acetylsulfonation

Acetylenic soot (Alfa Aesar, lot M30D003, 2.345 g) was placed into a 100 mL round-bottom flask to which glacial acetic acid (38.447 g) and sulfuric acid (5.581 g) were added. Acetylenic soot results from incomplete combustion of hydrocarbons in a reducing flame, and it includes very large polyaromatic hydrocarbon molecules (or small graphene fragments) edge-decorated with hydrogen atoms as well as oxygen-containing groups (e.g., —OH, =O, —COOH). The suspension was stirred and acetic anhydride (11.015 g) was added at room temperature. The resulting mixture was stirred for 1 hr and left to stand at room temperature for 48 hrs. The suspension was then filtered, rinsed with anhydrous acetic acid and dried under a flow of dry nitrogen on a vacuum filter.

Interactions of the Sulfonated Soot with Water and Cellulose

A few particles of the acetylsulfonated soot were added into a 10 mL test tube half-filled with distilled water. The particles sank to the bottom of the test tube unchanged. The test tube was placed in an ultrasonic bath for approximately 10 seconds. The particles rapidly disintegrated and dispersed in the distilled water to give it a dark gray color that remained unchanged for 1 week. The particles mostly settled upon standing for 1 month.

The suspension of the acetylsulfonated soot was similarly prepared in another test tube. To this test tube, cellulose (0.1 g) was added and the suspension was sonicated for 10 seconds. Upon standing, the resulting suspension settled within a few minutes, producing black precipitate and a clear, colorless aqueous phase. This experiment visually demonstrated the affinity of the sulfonated soot for cellulose.

Cellulose Hydrolysis in Water and Acetic Acid (Control)

To determine whether pure water or a dilute solution of acetic acid could catalyze cellulose hydrolysis, cellulose (1.000 g), 2-(N-morpholino)ethanesulfonic acid (MES, 0.090 g, used as internal standard) and 10.367 g $D_2O$ were autoclaved in a TEFLON (poly(tetrafluoroethylene)) liner placed into a pressurized Parr vessel for 24 hrs at 150° C. The resulting solution was analyzed by $^1H$ NMR and $^{13}C$ NMR. Subsequently, acetic acid (0.100 g) was added and the solution was thermalized again for 26 hrs at 150° C. The resulting solution was again analyzed by $^1H$ NMR and $^{13}C$ NMR.

Hydrolysis of cellulose in deionized water for 24 hrs released about 202 μmol of glucose, corresponding to a 3.3% yield, based on the starting cellulose. The light-yellow color of the obtained solution was ascribed to slight decomposition of the released glucose. Small peaks around the glucoside hydrogens in the $^1H$ NMR spectrum were ascribed to soluble glucose oligomers. Peaks from formic acid, 5-HMF, and furfural were also noted in the $^1H$ NMR spectrum of the product mixture. However, the amounts of those substances were so low that the quantification of those compounds could not be done by integration of their peaks in the $^1H$ NMR spectrum of the product mixture. No peaks from levulinic acid were observed.

An additional 26-hr long thermolysis with acetic acid resulted in an increase of the glucose concentration in the solution corresponding to total release of 405 μmol, corresponding to a 6.5% yield, based on starting cellulose. The resulting solution was very dark-brown, and had a film of insoluble compounds on the surface, which was consistent with the expected decomposition of glucose catalyzed by the aqueous acid.

Cellulose Hydrolysis with Bitumen in Water and Acetic Acid (Control)

To determine the ability of non-sulfonated bitumen to catalyze cellulose hydrolysis in the presence of acetic acid, cellulose (1.019 g), MES (0.109 g), non-sulfonated bitumen (0.221 g), and 10.329 g $D_2O$ were autoclaved in a Teflon liner placed into a pressurized Parr vessel for 24 hrs at 150° C. The resulting solution was analyzed by $^1H$ NMR and $^{13}C$ NMR. Subsequently, acetic acid (0.100 g) was added and the solution was thermalized again for 26 hrs at 150° C. The resulting solution was again analyzed by $^1$H NMR and $^{13}$C NMR.

No glucose was detected after 24 hrs of thermolysis of the aqueous cellulose suspension containing unsulfonated bitumen. Weak peaks ascribed to glucose did appear in the $^1$H NMR spectrum after the additional 26 h thermolysis with acetic acid. The amount of the glucose estimated by integration of the assigned signal was 35 μmols (about 0.6% yield based on the starting cellulose). Thus, the non-sulfonated bitumen did not assist in cellulose hydrolysis.

Cellulose Hydrolysis with Sulfonated Bitumen at Atmospheric Pressure

The stock solution of the acetylsulfonated bitumen (1.001 g), as described above, was placed with $H_2O$ (10 mL) into a closed 20 mL vial, and the vial was placed into an oven overnight at 85° C. to hydrolyze the mixed acetyl sulfonate and acetic anhydrides. Subsequently, the volatile components (water, acetic acid and chlorinated solvents) were evaporated by blowing dry nitrogen over the top of the liquid and then by keeping it overnight in an oven at 85° C. in an open vial. Cellulose (1.075 g) and water (10 mL) were added to the resulting sulfonated bitumen. The vial was closed and heated in an oven overnight at 85° C. The resulting solution was analyzed by NMR. No hydrolysis products were detected.

Thus, it was determined that sulfonated bitumen at atmospheric pressure did not assist in cellulose hydrolysis at 85° C.

High Pressure Cellulose Hydrolysis Catalyzed by Sulfonated Bitumen

The stock solution of the acetylsulfonated bitumen (1.010 g), prepared as described above, was placed with $H_2O$ (10 mL) in a closed 20 mL vial and the vial was placed into an oven overnight at 85° C. to hydrolyze the mixed acetyl sulfonate and acetic anhydrides. Subsequently, the volatile components (water, acetic acid and chlorinated solvents) were evaporated by blowing dry nitrogen over the top of the liquid and then by keeping it overnight in an oven at 85° C. in an open vial. The vial contents were transferred into a TEFLON liner containing 1.035 g cellulose, and 10 mL $D_2O$ were added. The liner was placed into a Parr pressure vessel, where it was heated to 150° C. for 24 hrs. A fraction of the resulting liquid was analyzed by $^1$H and $^{13}$C NMR. Then the solution was filtered through CELITE (diatomaceous earth), and the solids rinsed with water. The solvent was evaporated in nitrogen flow and the resulting solid weighted to measure the product yield. The product was derivatized with $Me_3SiCl$-pyridine and analyzed by mass-spectroscopy. The acidity of the resulting solution was estimated by means of pH indicator paper.

The mass of the hydrolysis product after the single hydrolysis run with unfractionated sulfonated bitumen was about 0.33 g, corresponding to 29% yield, based on the starting cellulose. The ratio of the integrals of all of the byproducts to those of glucose in the $^1$H NMR spectrum, not counting the HOD peak, was 0.31/6.93. The ratio provided an estimate for the purity of glucose at about 96%, assuming the absence of H/D exchange. No peaks associated with the catalyst were detectable in the $^1$H NMR spectrum. The low content of the acetic acid in glucose (1/100 mol fraction) indicated that the product had a negligible amount of the acetic acid that might have formed from the cellulose or the acetylsulfonated bitumen. The formic acid/glucose molar ratio was significantly higher (12 mol/100 mol), indicating that some formic acid might have formed from glucose decomposition. The high acidity of the resulting solution (pH⁻1.5 tested by indicator paper) and absence of significant amounts of other acids suggested that formic acid was the major source of protons in the solution.

Glucose thermolysis is known to yield 5-hydroxymethylfurfural (5-HMF). Its peaks were assigned based on comparison with a pure 5-HMF sample. This product was of particular concern because it may inhibit bacteria and yeasts if the glucose, made via cellulose hydrolysis, were used to feed fermentations. NMR peaks close to those of 5-HMF were observed and assigned to furfural. The integrals of the peaks assigned to furfural and those of 5-HMF suggested that the molar ratio of both furans to glucose was about 2/100.

The areas of the peaks assigned to levulinic acid at 2.39 and 1.91 ppm (0.08 and 0.02, correspondingly, with total area of 0.10) were lower than that of the formate peak at 8.05 ppm (0.11). The theoretical ratio of the integrals of the levulinic acid protons to that of formate was expected to be about 7/1. Instead, the measured ratio of the integrals (0.10/0.11), indicated that formic acid likely did not form from decomposition of 5-HMF.

The measured ratio of the integrals under glucose peaks (0.95/6.00) was close to the theoretical 1/6 value, indicating a negligible content of glucose oligomers in the product mixture. This suggested that the initial cellulose hydrolysis to the oligoglycosides was followed by a fast hydrolysis to glucose, likely catalyzed by aqueous acid.

Multiple Uses of Sulfonated Bitumen in Cellulose Hydrolysis

To hydrolyze the mixed anhydrides and remove the acetic acid, the stock sulfonated bitumen solution (1.126 g, containing 0.19 g of the catalyst), prepared as described above, was heated up with water (12.598 g) for 30 minutes at 85° C. The reaction mixture was then cooled down and the aqueous solution, containing acetic acid, was removed by pipetting. The remaining catalyst was transferred into a TEFLON-lined pressurized vessel. During three consecutive runs, fresh cellulose and water were added to the vessel and heated to 150° C. After each run the solution in the vessel was removed with a pipette, the solids were re-dispersed in fresh water, the dispersion was centrifuged, and the aqueous phase was poured into a collection flask. The aqueous phase was evaporated each time to measure the glucose yield. The unreacted cellulose, containing specks of the sulfonated bitumen catalyst, was placed back into the pressurized container together with fresh cellulose, so that the total amount of cellulose increased with each run, but the amount of the catalyst stayed the same. The amounts of cellulose used, glucose yields and the reaction rates are summarized in Table 1, below.

TABLE 1

Cellulose hydrolysis in three consecutive runs using the same catalyst

| Run | Time, hrs | Cellulose added before the run, g | Cumulative cellulose added, g | Glucose obtained in the run, g | Cumulative glucose obtained, g | Rate of glucose formation, mg/hr |
| --- | --- | --- | --- | --- | --- | --- |
| 1 | 24 | 1.144 | 1.144 | 0.097 | 0.097 | 4.04 |
| 2 | 24 | 0.988 | 2.132 | 0.102 | 0.199 | 4.25 |
| 3 | 21 | 1.022 | 3.154 | 0.072 | 0.271 | 3.43 |

As shown in Table 1, the rates of glucose formation did not increase significantly as increasing amounts of cellulose were added to hydrolysis mixture. This result is consistent with the expected mechanism, illustrated in FIG. 1, where the hydrolysis rate was dependent on the amount of the sulfonated bitumen molecules, intercalated into cellulose, rather than on the total amount of cellulose.

Sulfonated Bitumen Fractionation

A solution of 4.60 g of 98% $H_2SO_4$ in 27.0 g $Ac_2O$ was slowly added to a stirred solution of 8.915 g bitumen in 15.30 g DCM, containing 32.4 g $Ac_2O$, cooled to 0° C. in a 100 mL round-bottom flask. The mixture was then allowed to warm up to room temperature with continued stirring. After 24 hrs it was cooled down to 0° C. again, the excess $Ac_2O$ was destroyed by addition of ice, and the volatile components (DCM, $H_2O$ and HOAc) were removed by evaporation in a nitrogen stream.

To remove the acidic water-soluble components, which were believed to be potentially capable of catalyzing glucose degradation in the aqueous solution, water (75 g) was added to the flask and the solution was brought to boiling, and then cooled down. The resulting dark aqueous mixture, still having a strong smell of acetic acid, was poured into a 250 mL beaker while black less soluble fractions remained in the 100 mL round-bottom flask. The pH of the aqueous solution was estimated by universal indicator paper ($pH^-1$), indicating the presence of strong acids. The supernatant liquid did not scatter light, indicating it was a true solution rather than a colloid, and was discarded. This procedure was performed three more times; each time the water-soluble components were removed and discarded, while retaining the tarry water-insoluble product in the synthesis flask.

Reflux of the tarry product with water for the fourth time resulted in formation of a dark colloidal aqueous solution (fourth fraction), apparently formed by some poorly soluble compounds from the remaining sulfonated bitumen. The solution was decanted and diluted with 100 mL of 36% hydrochloric acid, resulting in phase separation of the dark insoluble compounds. The fifth fraction gave a similar product which was precipitated with HCl as well. The resulting suspensions from the 4th and 5th fractions were combined, filtered, dried on filter and later used for the determination of the catalytic activity.

The sixth reflux with water yielded an aqueous solution with lower opacity, indicating that most of the water-soluble compounds had been removed from the sulfonated bitumen. The catalytic activity of the remaining water-insoluble black tarry material was tested, as described, below.

Comparison of the Catalytic Activity of the Two Fractions of the Sulfonated Bitumen in Cellulose Hydrolysis Because the preceding hydrolysis experiment, performed for 24 hrs at 150° C., demonstrated 10% glucose yield, it was thought that performing the reaction at 180° C. could reduce the hydrolysis time to a few hours.

Two fractions of the sulfonated bitumen were used for the experiment. The first fraction was obtained via HCl precipitation from the colloidal solution of partly water-soluble sulfonated lignin. The second fraction was the water-insoluble sulfonated bitumen that did not form even a colloidal solution. An internal standard (MES) was used in both experiments.

TABLE 2

Cellulose hydrolysis with two fractions of the sulfonated bitumen

| Vial | Bitumen-$SO_3H$ | Cellulose | MES | $D_2O$ |
|---|---|---|---|---|
| 1 | Poorly $H_2O$-soluble, precipitated by HCl, 0.105 g | 1.032 g | 0.115 g | 10.598 g |
| 2 | $H_2O$-insoluble, 0.142 g | 1.046 g | 0.129 g | 12.199 g |

Keeping the aqueous cellulose suspensions, containing the two fractions of sulfonated bitumen, at 180° C. for 1 hr did not result in detectable hydrolysis. Without intending to be bound by theory, it was believed that this was because the temperature in the heavy-wall reactors, containing TEFLON inserts, did not equilibrate with that in the oven over such a short time.

To ensure that the reaction media had sufficient time to warm up to the oven temperature, the experiment was repeated. The pressurized containers were kept at 180° C. for 8 hrs. Both reactors were withdrawn from the oven and $Na_2CO_3$ (10 mg) was added to each of the solutions to shift the internal standard's peaks away from glucose peaks in the $^1H$ NMR spectra.

Heating up cellulose with the water-soluble (but HCl-insoluble) fraction of sulfonated bitumen at 180° C. for 8 hrs resulted in a 3.6% glucose yield. However, use of the water-insoluble catalyst fraction yielded 43.3% of glucose. The resulting solution had a dark color and a pH of 2.5, likely due to the autogenous formic acid and glucose decomposition products.

Catalysis of Cellulose Hydrolysis with Sulfonated Soot

Cellulose (0.996 g), acetylsulfonated soot (0.102 g) and MES (0.105 g) were sonicated in 14.631 g $D_2O$. Subsequently, 3.752 g of the resulting suspension were placed into a pressurized vessel and kept at 150° C. for 18 hrs. The sample was analyzed by integration of the lines in the $^1H$ NMR spectrum and glucose content quantified via comparison with the internal standard (MES).

To extend this run, the vial was again closed, placed back into the oven and kept at 180° C. for additional 16 hrs. The glucose yield was then determined as before.

Hydrolysis of cellulose in the presence of sulfonated soot catalyst produced glucose with 3.1% yield after 18 hrs at 150° C. and a total of 6.6% yield after an additional 16 hrs hydrolysis at 180° C. Based on these results, Example 11 demonstrated that the use of a sulfonated soot catalyst did not substantially assist in cellulose hydrolysis.

The foregoing examples demonstrated that sulfonated bitumen was an active catalyst for cellulose hydrolysis under hydrothermal conditions (140-180° C., few hours). The hydrolysis also yielded small amounts of formic acid, furfural and 5-hydroxymethylfurfural. No glucoside oligomers were detected in the aqueous solution, which was believed to be because the hydrolysis of glucosides in the aqueous solution was faster than the rate of their initial formation from cellulose due to the formic acid present in the water.

The solubility of the sulfonated bitumen in water was so low that no traces of the catalyst could be detected in the aqueous solutions by $^1H$ NMR. In fact, the least soluble fraction of the sulfonated bitumen was the most active catalyst, yielding 43.3% glucose.

Furthermore, the examples demonstrated that upon initial contact with water, the acetylsulfonated soot did not wet well, which was believed to be due to the hydrophobic character of the carbon cores, as well as the H and $SO_3Ac$ side groups. The sonication exposed a sufficient number of the $SO_3Ac$ groups to water, causing these groups to quickly hydrolyze. The resulting sulfonic acid groups deprotonated so that the same-charged molecules repelled each other and increased the contact of the remaining $SO_3Ac$ groups with water. Those processes of the hydrolysis of the acetylsulfonate groups, repulsion of the sulfonate ions, and exposure of the increasing number of remaining —$SO_3Ac$ groups to water accelerated each other and resulted in a nearly instantaneous disintegration of the particles of the original acetylsulfonated soot. Without intending to be bound by theory, the quantitative fast co-precipitation of the sulfonated soot with cellulose was believed to be due to the hydrophobic fragments of the sulfonated soot strongly adhering to the hydrophobic fragments of cellulose. However, the lack of cellulose hydrolysis catalysis with sulfonated soot was unexpected, especially after the successful demonstration of the catalytic ability of sulfonated bitumen. Without intending to be bound by theory, it is believed that the sulfonated soot ions were so large that they tended to firmly adhere to the outside surface of the cellulose crystallites via multiple hydrophobic interactions. It was believed that the subsequent intercalation into cellulose crystallites may have required several steps—such as the initial detachment from the crystallite surface, diffusion, transitional cellulose decrystallization, and the actual diffusion of the sulfonated soot molecule into the crystallites. However, the large size of the sulfonated soot anions was believed to make the activation energies of the corresponding processes prohibitively high, so that the intercalation and the subsequent hydrolysis did not take place. Moreover, soot molecules, while full of flat regions, likely have substantial 3D frameworks formed by spa-hybridized carbon atoms, inhibiting their intercalation into "flat" regions of the cellulose crystal.

In contrast, the sulfonated bitumen molecules, having an advantageous smaller size, were believed to require smaller activation energies to overcome these barriers, so that they were capable to intercalate into the cellulose structure and catalyze its hydrolysis.

The foregoing examples advantageously demonstrate that the application of the highly reactive cellulose hydrolysis catalysts in biomass processing has the potential to reduce the price of glucose to a level that can make it an attractive feedstock for subsequent transformations.

Example 2

Preparation and Evaluation of Sulfonated Oxidized Bitumen Catalysts

This example illustrates the influence of the introduction of additional oxygen-containing groups into the sulfonated catalyst. Partial oxidation has the potential to increase catalytic activity of the sulfonated bitumen by converting some of the weakly polar groups on the sides of the aromatic bitumen molecules (e.g., alkyl, —CH═CH—, etc.) into more polar groups, such as ketone/carbonyl groups (—C═O) or carboxylate groups (—COOH). These groups could form additional hydrogen bonds to the hydroxide groups of nearby cellulose molecules, thus increasing the affinity of the resulting molecules for cellulose. Additionally, partial oxidation can improve solubility characteristics, and in turn processing characteristics, of the sulfonated catalyst. Sulfonated bitumen was highly soluble in chlorinated solvents (e.g., chloroform, dichloromethane), but use of such solvents could be undesirable for large-scale biomass processing. At the same time, sulfonated bitumen was incompletely soluble in acetone, which is much less toxic and potentially a more useful solvent for large-scale biomass processing. Thus, partial oxidation to introduce more oxygen-containing groups was evaluated as a means to improve catalyst solubility in more health- and environment-friendly solvents such as acetone, which would also facilitate catalyst recovery. Also, oxidation of the sulfonated bitumen was expected to transform the side alkyl chains, which diminish the molecule's affinity for cellulose, into more polar carbonyl and carboxylate groups. That change was expected to increase the catalyst's affinity for cellulose and, therefore, its activity in the hydrolysis reaction.

Bitumen (Marathon, 5.317 g) was dissolved in in 40 mL $CHCl_3$. Subsequently, acetic anhydride $Ac_2O$ (8 mL) was added to create a dark-colored uniform solution with low viscosity. A 1.010 g sample of 98% $H_2SO_4$ was added. The resulting mixture was stirred. An 8 mL sample of $SOCl_2$ was added and gas evolution ensued. The sulfonation reaction scheme is shown below.

$$R-H+H_2SO_4+SOCl_2=R-SO_3H+SO_2+2HCl$$

The flask was cooled by immersion into an ice bath to slow down the reaction, and left overnight to react. The next day, the flask was gently heated in an oil bath and air was blown over the surface overnight to remove the excess of $SOCl_2$, HCl, $SO_2$ and acetic acid (AcOH). The effluent air was bubbled through aqueous $NaHCO_3$ to absorb any acids. In this step, all the volatile liquids and gases ($SO_2$, HCl and $SOCl_2$) evaporated. Then, 5.6 g $Na_2Cr_2O_7$ and 50 ml HOAc were added and the flask was heated to 105° C. in an oil bath for 4 hrs to partly oxidize the bitumen sulfonic acids. Then, 40 ml of water were added to hydrolyze $Ac_2O$ into a more volatile AcOH, which transformed the reaction mixture into a black uniform suspension. Air was blown into the flask to reduce the volume of the solution by partial solvent evaporation. When the content of the flask solidified, it was dispersed in 5% aqueous HCl, centrifuged, and rinsed with 5% aqueous HCl until the solution. The solution was then centrifuged with deionized water until the precipitate began to form a suspension in the solution. The solvent was dried by keeping it under a flow of dry nitrogen to result in 8.611 g of a dry powdery material. Both the starting and the sulfonated oxidized bitumen material were characterized by elemental analysis, NMR, and IR spectroscopies.

An elemental analysis of the starting bitumen indicated it included 83.33% carbon, 9.36% hydrogen, and 0.57% nitrogen. An elemental analysis of the sulfonated oxidized bitumen indicated it included 49.19% carbon, 6.09% hydrogen, and 0.39% nitrogen. The NMR and IR spectra confirmed the formation of sulfonated oxidized bitumen.

Cellulose Hhydrolysis

Cellulose (Aldrich, 1.098 g, 6778 mkmols), sulfonated oxidized bitumen (0.106 g), morpholine ethane sulfonic acid (MES, Sigma-Aldrich, 0.013 g, 66.7 mkmoles) used as an internal standard, and water (11.679 g) were combined in a TEFLON cup which was briefly flushed with nitrogen and then autoclaved in a Parr pressurized vessel at 160° C. for 25 hrs. The resulting solution was filtered through CELITE, and the filtrate was evaporated in a stream of dry nitrogen to yield 0.213 g of solid material. A sample of that material was redissolved in $D_2O$ and made alkaline with $Na_2CO_3$ to shift the MES peaks from the glucose peaks. $^1H$ NMR and $^{13}C$ NMR spectra were obtained for the resulting sample. The yields of the products were measured by integration of the corresponding NMR peaks. No signals attributable to the catalyst were observed in the NMR spectra. The NMR indicated a glucose yield of about 7.8%, a levulinic acid yield of about 1.2%, a 5-HMF yield of about 0.6%, and a furfural yield of about 0.7%.

Catalyst Recovery and the Second Hydrolysis

Because the highest catalytic activity was exhibited by water-insoluble fractions of sulfonated bitumen, as shown in Example 1, it was expected that the water-insoluble fractions of the sulfonated oxidized bitumen would also be catalytically active. However, the molecular weight and molecule size of the active species had to be restricted so that they exhibit at least some mobility under the reaction conditions. Therefore, without intending to be bound by theory, it was expected that these reactive molecules would likely exhibit solubility in a solvent media somewhat less polar than water, such as acetone. The polar carbonyl groups of the catalyst were expected to increase the solubility of the catalyst in acetone as well.

The solids leftover from the reaction mixture filtration were rinsed with acetone and the resulting acetone solution, which was expected to contain the active catalyst, was evaporated in the same TEFLON reaction vessel. This procedure increased the weight of the vessel by 0.052 g, which was interpreted as weight of the recovered catalyst fraction, which was expected to exhibit substantial catalytic activity. This catalyst could be contaminated by water-insoluble acetone-soluble products of cellulose decomposition. The resulting solid crust was rinsed with 36% aqueous HCl to remove metal ions, in case any metals were introduced into the catalyst in the process of handling. The solid was then rinsed with water to remove the residual HCl and used for the second cellulose hydrolysis run.

Cellulose (0.998 g, 6160 mkmols) and water (10.048 g) were added to the TEFLON liner which was briefly flushed with nitrogen and then autoclaved in a Parr pressurized vessel at 160° C. for 25 hrs. The resulting solution, was significantly darkened and exhibited a strong smell of burning wood and was filtered through CELITE, rinsed with water to recover glucose, and the filtrate evaporated in a stream of dry nitrogen, yielding 0.353 g of solidified material. Then, potassium hydrogen phthalate (KHP, 0.024 g) was added to that material with 2 mL $D_2O$ and the solution was gently warmed up until all solids were dissolved. The resulting solution was filtered into a NMR tube and analyzed by $^1H$ and $^{13}C$ NMR. The integration of the lines in the $^1H$ NMR spectrum of the resulting solution was used to quantify the yields. The NMR indicated a glucose yield of about 19.7%, a levulinic acid yield of about 3.9%, a 5-HMF yield of about 0.5%, and a furfural yield of about 0.05%.

The IR demonstrated the that oxidation of sulfonated bitumen resulted in the appearance of new carbonyl and carboxylate groups, as indicated by the strong peaks in the 1600-1700 $cm^{-1}$ region of the spectrum. A broad band in the 3000-3600 $cm^{-1}$ was ascribed to the O—H stretches resulting from the —$SO_3H$, —COOH groups, as well as retained water molecules. The intense 1036 and 1162 $cm^{-1}$ peaks were ascribed to the —$SO_3H$ groups.

The diminished carbon content of the sulfonated oxidized bitumen was consistent with the oxidation and sulfonation of the material. However, the intense 2851 $cm^{-1}$ and 2920 $cm^{-1}$ bands in the IR spectrum, as well as a strong peak in the 0.5-2.0 ppm region of the $^1H$ NMR spectrum indicated the presence of alkyl groups that survived the oxidation process. Without intending to be bound by theory, it is believed that further oxidation of the material would generate even more active catalysts.

Example 2 demonstrates the catalytic activity of the sulfonated oxidatized bitumen, as well as the recovery of the bitumen and the catalytic activity of the recovered bitumen.

Example 3

Determination of Activation Enthalpy of Cellulose Hydrolysis Catalyzed by Sulfonated Bitumen A series of variable-temperature reactions were performed to determine the reaction activation energy. Because the previous hydrolysis experiments indicated that the water-insoluble fraction of sulfonated lignin exhibited the highest catalytic activity, a new catalyst batch was prepared accordingly. In a typical experimental setup, aliquots of suspensions of cellulose and catalyst in $D_2O$ were loaded into a series of pressurized tubes that were placed into a preheated oven. The tubes were removed after increasing intervals of time and centrifuged. The supernatant solution was placed into NMR tubes with a standard (teraethylammonium iodide) and glucose yield was measured by integration of the NMR lines. The slope of the glucose yield vs. time for the initial points was used to determine the initial rate of the hydrolysis reaction, measured in % glucose yield/hr. The plot of the ln(rate) vs. 1/T yielded the activation energy.

Catalyst Preparation

Bitumen (11.7 g) was dissolved in $CH_2Cl_2$ (34.5 g) in a 100 mL round bottom flask upon stirring on gentle warming until all solid dissolved. The solution was cooled down with ice, after which 98% $H_2SO_4$ (2.6 g) and acetic anhydride (8 mL) were added and stirred until all sulfuric acid had dissolved. Subsequently, $SOCl_2$ (8 mL) was added to the flask, while the flask continued to be cooled with ice. The mixture started to steadily evolve gases (HCl and $SO_2$) that were absorbed in a trap. The setup was allowed to warm up to room temperature overnight. The next day, the remaining $CH_2Cl_2$ and $SOCl_2$ were distilled out at 80° C.; some of the remaining $SOCl_2$ was distilled out by applying vacuum from a water aspirator. To soften the resulting organic material (which formed a black solid) and remove its water-soluble components, water (10 mL) and chloroform (10 mL) were added to the flask. The flask was heated up to gentle reflux until chloroform dissolved all the organic material, and two layers—an aqueous and a heavy organic—formed. The aqueous layer, containing $H_2SO_4$, HCl, and low-molecular weight sulfonic acids, was poured off and the remaining organic phase was rinsed with water two more times. The organic material was dried by gentle heating while dry nitrogen was passed over the top of the material. However, even after 3 days of drying, the material still smelled of acetic acid.

Elemental analysis of the resulting product indicated that carbon was present in an amount of about 69.48%, hydrogen was present in an amount of about 8.84%, and nitrogen was present in an amount of about 0.51%.

Stock Solution Preparation

Sulfonated bitumen (0.50 g) was dissolved in 10 mL of chloroform in a 100 mL round bottom flask upon stirring with a magnetic bar. The mixture was heated up to reflux and stirred with a magnetic bar until all sulfonated bitumen was dissolved. After, cellulose (5.0 g) and $D_2O$ (50 g) were added to the flask and contents of the flask were vigorously stirred to form a suspension of cellulose and sulfonated bitumen-chloroform droplets in $D_2O$. To remove chloroform, the flask was heated to 70° C. upon vigorous stirring and the chloroform vapor was carried away by blowing dry nitrogen over the solution surface. The end point of the chloroform evaporation was determined gravimetrically.

Sample Preparation

The stock cellulose-catalyst suspension in $D_2O$ was stirred for at least 30 minutes before taking out an aliquot. Then two 1 mL aliquots were withdrawn, upon vigorous stirring, from the stock suspension and placed into each of pre-weighed 4 mL, Aldrich pressurized tubes. The weights of the tubes with reactants were recorded. A set of the tubes was quickly placed into a pre-heated oven. Subsequently, the tubes were removed from the oven, each one after a preset time interval, and visually inspected for the solution losses and/or seal breakage. The tubes were centrifuged for half an hour. The clear aqueous phase (0.5 mL) was transferred into a fresh NMR tube and the weight of the aliquot was determined. The glucose yield was measured by integration of the glucose lines in the $^1H$ NMR spectrum and comparison with integrals of a standard NEW solution.

The glucose yields were plotted vs. time for each temperature. A few initial points, for which the glucose yield increased linearly, were used to find the initial hydrolysis rate. Subsequently, logarithms of those initial rates were plotted vs. 1/T to obtain the hydrolysis activation enthalpy. The initial rates of glucose formation (i.e., cellulose hydrolysis) are summarized in Table 3.

TABLE 3

Initial rates of cellulose hydrolysis and glucose formation

| T, °C. | T, K | 1/T, $K^{-1}$ | r, %/hr | Ln(r), %/hr |
|---|---|---|---|---|
| 130 | 403.15 | 0.00248 | 0.322 | −1.134 |
| 140 | 413.15 | 0.00242 | 0.799 | −0.224 |
| 150 | 423.15 | 0.00237 | 1.027 | 0.027 |
| 160 | 433.15 | 0.00231 | 2.739 | 1.008 |
| 170 | 443.15 | 0.00226 | — | — |
| 180 | 453.15 | 0.00221 | 6.495 | 1.871 |

Slope = 10906K
ΔH = 90628.9 J/mol~90.6 kJ/mol

The cellulose hydrolysis activation energy, found in this study, was 90.6 kJ/mol. Notably, the experimental activation energy was lower than the calculated theoretical energy of 115 kJ/mol, in which a hydrated proton travels from the bulk water to protonate the C—O—C glycoside linkage. The value is also much lower than the 174.7 kJ/mol found for $H_2SO_4$ catalysis. Rather, it was closer to 83.0 kJ/mol found by other researchers for a polystyrene-type catalyst containing —$CH_2Cl$ and —$CH_2$—NH—$C_6H_4$—$SO_3H$ groups. The abundance of the hydrophobic aromatic groups in the modified polystyrene and the sulfonated bitumen suggested that the mechanisms of cellulose hydrolysis by those two catalysts could be similar as well. Thus, without intending to be bound by theory, it is believed that the mechanism of cellulose hydrolysis using the method of the disclosure includes cellulose protonation by the catalyst molecules incorporated into the structure of cellulose. This mechanism does not require a complete dehydration of the hydrated protons existing in the aqueous solution, thereby providing a pathway for cellulose hydrolysis with lower activation energy than that of a strong aqueous acid like $H_2SO_4$.

Not only was it found that the catalyst had low activation enthalpy in the cellulose hydrolysis reaction compared to conventional chemical catalysts, but various conditions that can be used to increase the glucose yield in comparison with our prior result. Namely, hydrolysis at 130° C. for 48 hrs yielded 46.7% glucose. These results suggested that the glucose yield may be further increased by reducing the process temperature and increasing the time.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, articles, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for hydrolyzing cellulosic material, the method comprising:
    admixing a cellulosic material with a sulfonated polyaromatic catalyst in water under temperature and pressure sufficient to at least partially hydrolyze the cellulosic material and to form a monosaccharide hydrolysis product, thereby providing a reaction mixture comprising (i) an aqueous phase comprising the water and the monosaccharide hydrolysis product in solution therein, and (ii) a dispersed phase comprising the sulfonated polyaromatic catalyst; and,
    recovering the monosaccharide hydrolysis product from the aqueous phase of the reaction mixture;
    wherein the sulfonated polyaromatic catalyst comprises a mixture of partially sulfonated polycyclic aromatic hydrocarbons that is substantially insoluble in the aqueous phase.

2. The method of claim 1, wherein polycyclic aromatic hydrocarbons in the mixture of partially sulfonated polycyclic aromatic hydrocarbons have at least 3 aromatic units.

3. The method of claim 1, wherein polycyclic aromatic hydrocarbons in the mixture of partially sulfonated polycyclic aromatic hydrocarbons are selected from the group consisting of triphenylene, tetraphenylene, pentaphenylene, tetracene, pentacene, hexacene, heptacene, octacene, nonacene, decacene, condensed derivatives thereof, quinone derivatives thereof, hydroxylated derivatives thereof, alkylated derivatives thereof, carbonylated derivatives thereof, carboxylated derivatives thereof, and combinations thereof.

4. The method of claim 1, wherein the mixture of partially sulfonated polycyclic aromatic hydrocarbons has a degree of sulfonation of about 10 wt. % to about 20 wt. %.

5. The method of claim 1, wherein polycyclic aromatic hydrocarbons in the mixture of partially sulfonated polycyclic aromatic hydrocarbons are also at least partially oxidized.

6. The method of claim 1, wherein the sulfonated polyaromatic catalyst is present in the reaction mixture in an amount ranging from about 0.5 wt. % to about 5 wt. %, based on the total weight of the reaction mixture.

7. The method of claim 1, wherein the cellulosic material is present in the reaction mixture in an amount ranging from about 5 wt. % to about 90 wt. %, based on the total weight of the reaction mixture.

8. The method of claim 1, wherein the weight ratio of the sulfonated polyaromatic catalyst to the cellulosic material in the reaction mixture is in a range of about 1:5 to about 1:100.

9. The method of claim 1, wherein the cellulosic material is obtained from a lignocellulosic biomass.

10. The method of claim 1, wherein the monosaccharide hydrolysis product is selected from the group consisting of glucose, xylose, mannose, galactose, rhamnose, arabinose, and combinations thereof.

11. The method of claim 1, wherein the cellulosic material comprises at least one of cellulose and hemicellulose.

12. The method of claim 1, comprising performing the admixing in a pressurized vessel.

13. The method of claim 1, comprising performing the admixing at a temperature of about 100° C. to about 180° C.

14. The method of claim 1, comprising performing the admixing for about 3 to about 48 hours.

15. The method of claim 1, comprising performing the admixing under acidic conditions.

16. The method of claim 1, wherein about 5 wt. % to about 95 wt. % of the initial cellulose material is converted the monosaccharide hydrolysis product.

17. The method of claim 1, wherein the aqueous phase of the reaction mixture is substantially free of the sulfonated polyaromatic catalyst.

18. The method of claim 1, wherein the monosaccharide hydrolysis product is substantially free of the sulfonated polyaromatic catalyst.

19. The method of claim 1, further comprising:
recovering the sulfonated polyaromatic catalyst from the reaction mixture;
admixing a second cellulosic material with the recovered sulfonated polyaromatic catalyst in water to provide a second reaction mixture having an aqueous phase and a dispersed phase; and,
recovering a second monosaccharide hydrolysis product from the aqueous phase of the second reaction mixture.

20. The method of claim 1, wherein the mixture of partially sulfonated polycyclic aromatic hydrocarbons is selected from the group consisting of partially sulfonated bitumen, partially sulfonated tar, partially sulfonated pitch, partially sulfonated creosote, fractions thereof, and combinations thereof.

21. The method of claim 1, wherein the mixture of partially sulfonated polycyclic aromatic hydrocarbons comprises partially sulfonated bitumen.

22. The method of claim 1, wherein the mixture of partially sulfonated polycyclic aromatic hydrocarbons comprises a fraction of partially sulfonated bitumen.

23. The method of claim 22, wherein the fraction of partially sulfonated bitumen excludes at least one of non-aromatic components and low molecular weight components from polycyclic aromatic hydrocarbons in the fraction of partially sulfonated bitumen.

24. The method of claim 22, wherein the fraction of partially sulfonated bitumen is a water-insoluble fraction.

25. The method of claim 1, wherein:
the monosaccharide hydrolysis product is selected from the group consisting of glucose, xylose, mannose, galactose, rhamnose, arabinose, and combinations thereof;
the method comprises performing the admixing at a temperature of about 100° C. to about 180° C.; and
the mixture of partially sulfonated polycyclic aromatic hydrocarbons comprises at least one of partially sulfonated bitumen and a fraction of partially sulfonated bitumen.

26. The method of claim 25, wherein:
the sulfonated polyaromatic catalyst is present in the reaction mixture in an amount ranging from about 0.5 wt. % to about 5 wt. %, based on the total weight of the reaction mixture;
the cellulosic material is present in the reaction mixture in an amount ranging from about 5 wt. % to about 90 wt. %, based on the total weight of the reaction mixture;
the weight ratio of the sulfonated polyaromatic catalyst to the cellulosic material in the reaction mixture is in a range of about 1:5 to about 1:100; and
the cellulosic material comprises at least one of cellulose and hemicellulose.

27. The method of claim 26, wherein:
the mixture of partially sulfonated polycyclic aromatic hydrocarbons has a degree of sulfonation of about 10 wt. % to about 20 wt. %; and
about 5 wt. % to about 95 wt. % of the initial cellulose material is converted the monosaccharide hydrolysis product.

\* \* \* \* \*